(12) United States Patent
Subramanian

(10) Patent No.: US 11,386,407 B2
(45) Date of Patent: *Jul. 12, 2022

(54) SYSTEMS AND METHODS FOR USE IN CLEARING AND/OR SETTLING NETWORK TRANSACTIONS

(71) Applicant: MASTERCARD INTERNATIONAL INCORPORATED, Purchase, NY (US)

(72) Inventor: Shankar Subramanian, Dardenne Prairie, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/997,689

(22) Filed: Aug. 19, 2020

(65) Prior Publication Data

US 2020/0380480 A1    Dec. 3, 2020

Related U.S. Application Data

(63) Continuation of application No. 15/711,703, filed on Sep. 21, 2017, now Pat. No. 10,769,601.

(51) Int. Cl.
*G06Q 20/10* (2012.01)
*G06Q 20/40* (2012.01)
*G06Q 20/02* (2012.01)
*G06Q 20/42* (2012.01)

(52) U.S. Cl.
CPC ........... *G06Q 20/10* (2013.01); *G06Q 20/023* (2013.01); *G06Q 20/401* (2013.01); *G06Q 20/405* (2013.01); *G06Q 20/42* (2013.01)

(58) Field of Classification Search
CPC .... G06Q 20/405; G06Q 20/401; G06Q 20/10; G06Q 20/023; G06Q 20/42
See application file for complete search history.

(56) References Cited

U.S. PATENT DOCUMENTS

| 8,447,693 B2 | 5/2013 | Lynch et al. |
| 2010/0217711 A1 | 8/2010 | Olson et al. |
| 2013/0024364 A1 | 1/2013 | Shrivastava et al. |
| 2019/0087795 A1 | 3/2019 | Subramanian |

*Primary Examiner* — Scott S Trotter
(74) *Attorney, Agent, or Firm* — Harness, Dickey & Pierce, P.L.C.

(57) ABSTRACT

Systems and methods are provided for processing network transactions. One exemplary method includes transmitting a network request, received from a first entity, to a second entity; intercepting a network reply from the second entity, when the network reply is associated with the first entity and the first entity is a registered entity; appending an indicator to the network reply when a rule associated with the first entity is satisfied by a parameter of the network reply; and appending a transaction associated with the network reply to a settlement process when the rule is satisfied by the parameter. The exemplary method further includes transmitting the network reply, with the appended indicator, to the first entity, whereby, upon identifying the indicator, the first entity is permitted to omit the transaction from further reporting related to clearing and/or settlement of the transaction.

20 Claims, 3 Drawing Sheets

SYSTEMS AND METHODS FOR USE IN CLEARING AND/OR SETTLING NETWORK TRANSACTIONS

CROSS-REFERENCE TO RELATED APPLICATION

Figure 1:
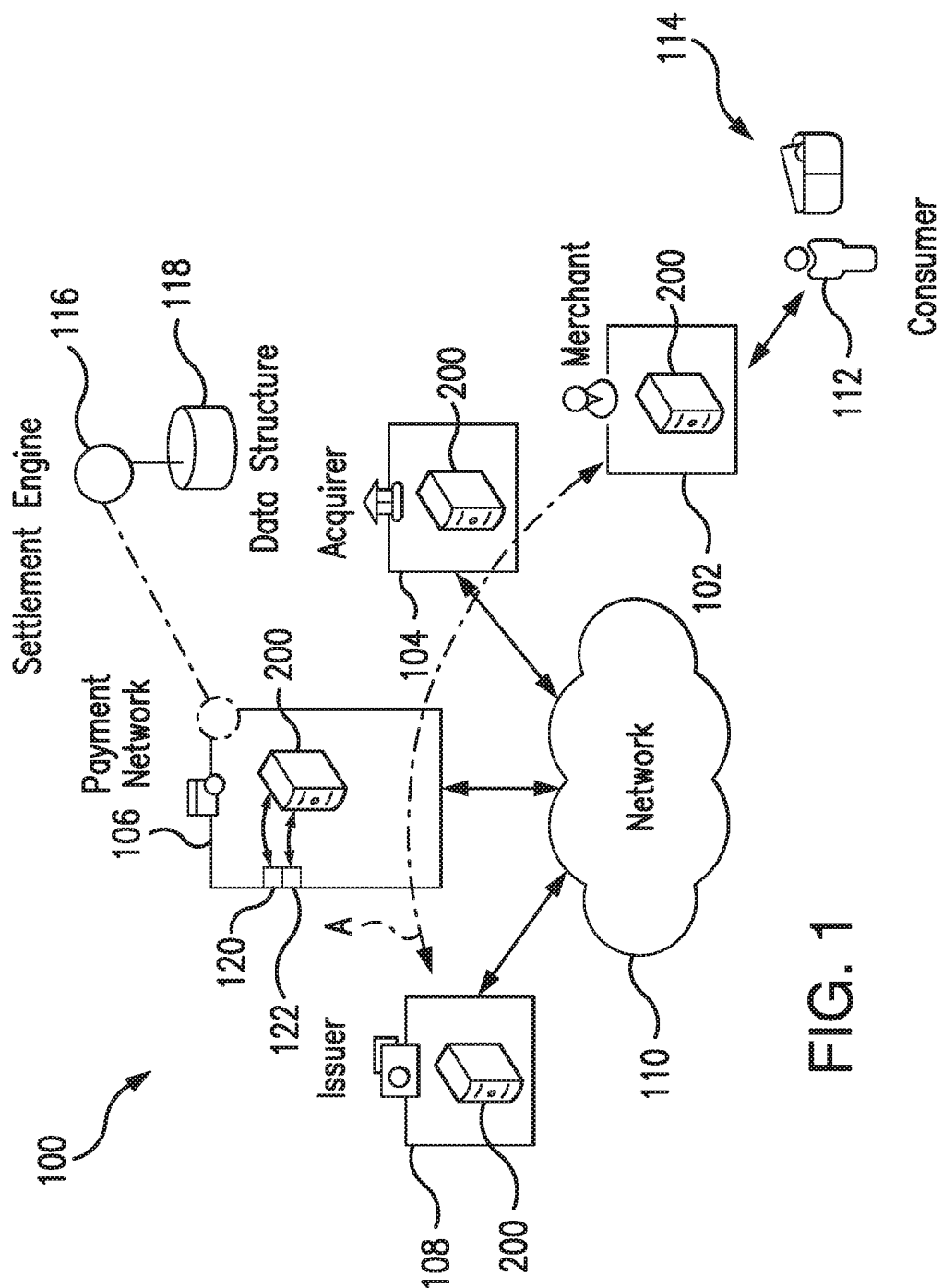

This application is a continuation of U.S. patent application Ser. No. 15/711,703, filed on Sep. 21, 2017 (now U.S. Pat. No. 10,769,601). The entire disclosure of the above application is incorporated herein by reference.

FIELD

The present disclosure generally relates to systems and methods for use in clearing and/or settling network transactions, and in particular, for use in clearing and/or settling network transactions by one entity, on behalf of another entity, where the network transactions are particular types of transactions such as, for example, irreversible transactions.

BACKGROUND

This section provides background information related to the present disclosure which is not necessarily prior art.

Products are often purchased through payment account transactions, which may involve one or multiple transacting institutions (e.g., banks, etc.). The transactions are coordinated through one or more payment networks, and generally involve authorization, clearing and settlement. It is known for authorization of the transactions to occur immediately upon the request of consumers for the transactions, whereby merchants involved in the transactions are permitted to deliver the products to the consumers. However, the clearing and settlement processes typically take two or more days to complete. The clearing process involves the reporting of transactions from the merchants and/or associated acquirers, and also from the issuers (broadly, transacting institutions), to corresponding payment networks for processing, whereupon the transactions are balanced against different involved transacting institutions. The clearing process may also involve, from time to time, one or more adjustments to the transactions, whereby the amounts of the authorized transactions may be altered (e.g., based on addition of tips, fee assessments, etc.), etc. As an example, for a dining transaction, the authorized transaction amount typically includes an amount for actual food ordered, while the clearing transaction amount then includes addition of a tip. As another example, for a car rental transaction, the authorized transaction amount typically includes an amount for expected vehicle use, while the clearing transaction amount then includes actual expenses (e.g., added fuel expenses, etc.). In any case, once the clearing process is complete, clearing files are provided to the transacting institutions (e.g., as presentments, etc.). And then, in connection therewith or after, the settlement process provides transfer of funds between the accounts of the transacting institutions, and specifically, the consumers' accounts and the merchants' accounts.

It is further known for payment account transactions to be different. Some transactions involve large purchases, while other transactions involve small purchases. Additionally, certain payment account transactions (typically relating to specific categories of transactions and generally identified based on merchant category/acquiring terminal type) are known to be irreversible, often where authorization amounts and clearing amounts associated with the transactions do not differ. Example irreversible transactions may include kiosk transactions, where purchased products are immediately delivered (e.g., from vending machines, etc.), or fast food transactions, where food products are immediately delivered once the transactions are approved (and where the exact actual authorized transaction amount is reflected in clearing, and further in the consumer's statement).

DRAWINGS

The drawings described herein are for illustrative purposes only of selected embodiments and not all possible implementations, and are not intended to limit the scope of the present disclosure.

Figure 2:
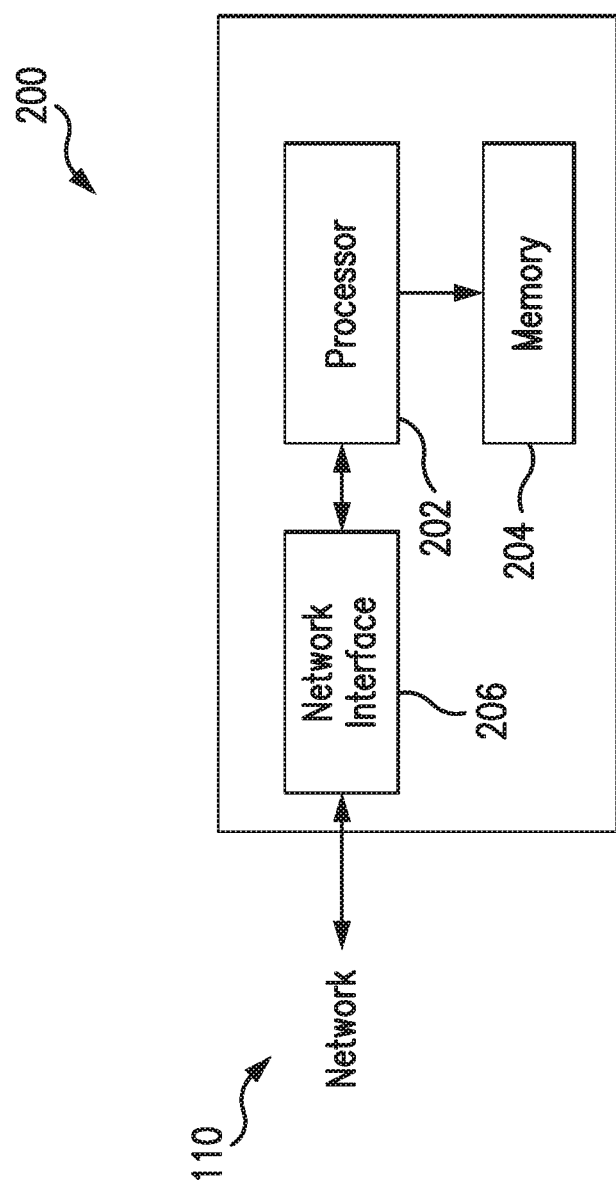
Figure 3:
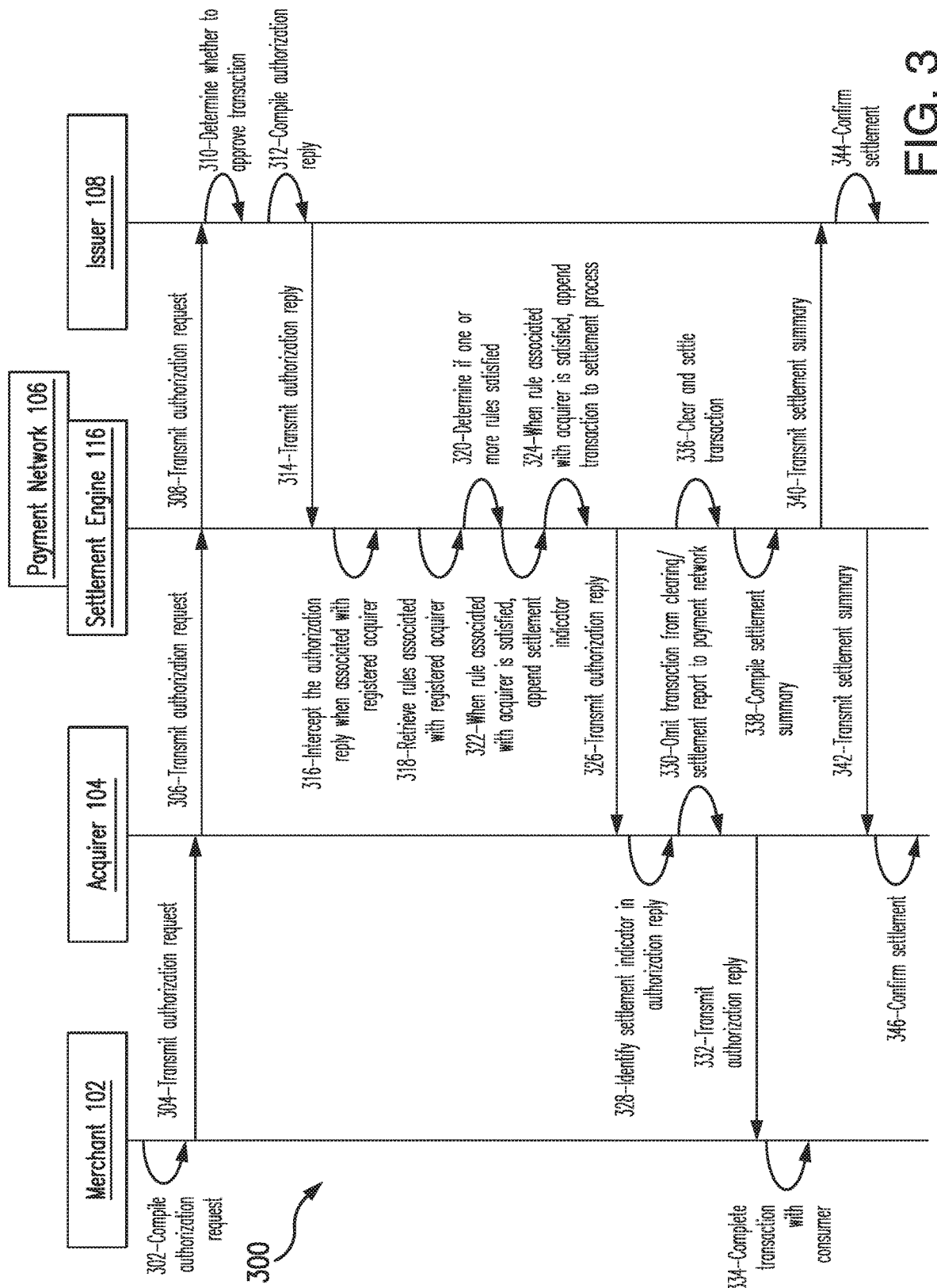

FIG. 1 illustrates an exemplary system of the present disclosure suitable for use in settling a payment account transaction on behalf of an acquirer associated with the transaction, via a payment network;

FIG. 2 is a block diagram of a computing device that may be used in the exemplary system of FIG. 1; and FIG. 3 is a flow diagram of an exemplary method, which may be implemented in connection with the system of FIG. 1, for use in providing transaction settlement to an acquirer as a service, via a payment network, for an irreversible-type transaction submitted to the payment network via the acquirer.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Consumers often fund purchase transactions for products with payment accounts. In so doing, authorization, clearing and settlement of the transactions may take multiple days to complete. Authorization of the transactions may occur relatively quickly. However, clearing and settlement may take longer as clearing provides an opportunity to correct, edit or otherwise alter the transactions for accuracy and/or completeness prior to settlement, where appropriate funds are then transferred to corresponding accounts. For certain types of transactions, for example, which are generally of low value, the transactions are "irreversible," whereby no changes are generally imposed to the transactions during clearing.

Uniquely, the systems and methods herein provide settlement as a service, by a payment network, to an acquirer for certain transactions associated with the acquirer (e.g., certain irreversible transactions, etc.), whereby after the transactions are authorized the acquirer may ignore the transactions during clearing and settlement. In particular, when a certain transaction, as defined by one or more criteria (e.g., satisfies a limited transaction amount, etc.), is authorized through the payment network, the payment network is able to intercept an authorization reply for the transaction from an issuer associated with the transaction. Thereafter, the payment network appends a flag indicator to the authorization reply, and includes the transaction in a clearing file at the payment network, generally immediately, whereupon the transaction is cleared and settled in a next clearing cycle by the payment network (instead of waiting multiple days as is conventional). Then, when the acquirer associated with the transaction receives the authorization reply, with the flag indicator appended thereto, the acquirer forwards the reply to a corresponding merchant and ignores and/or otherwise omits the transaction from its clearing process. In this manner, the acquirer is permitted to offload the clearing and settlement of the transaction to the payment network, thereby alleviating the acquirer's work in later reporting the transaction (and other similar transactions) to the payment network and/or participating in the clearing and settlement processes (as would be conventional), while at the same time advancing the transaction for more prompt settlement.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, authorization, clearing and/or settlement processes employed by the transacting institutions included in the system 100, etc.

As shown in FIG. 1, the illustrated system 100 generally includes a merchant 102, an acquirer 104 associated with the merchant 102, a payment network 106, and an issuer 108 configured to issue payment accounts to consumers, each or which is coupled to (and is in communication with) a network 110. The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or among any combination thereof. In one example, the network 110 may include multiple networks, where different ones of the multiple networks are accessible to different ones of the illustrated parts in FIG. 1. In particular, in this example, the acquirer 104, the payment network 106, and the issuer 108 may be connected via a private payment transaction network that is part of network 110 for processing payment account transactions, and the merchant 102 may be connected with the acquirer 104, for example, through a public network, such as the Internet, that is also part of network 110.

In the illustrated embodiment, the merchant 102 is configured to offer and to sell products (e.g., goods, services, etc.) to consumers, including, for example, to consumer 112. In general, in connection with the present description, the products offered by the merchant 102 are often products of a type whereby transactions for the purchase of the products are considered irreversible and/or irrevocable. In connection therewith, example products may include fast food items, transmitted ticket products, vending merchant products, etc. In this manner, the merchant 102 may include a vending machine at a specific location, a kiosk-type point of sale (POS) device at a transit station, or a POS device for use by a merchant user (e.g., an employee, etc. at a fast food location, etc.), etc. With that said, it should be appreciated that the merchant 102, and the type of devices included at the merchant 102, are not limited to the examples provided herein.

In general, the consumer 112 interacts with the merchant 102 to purchase one or more of the products. The consumer 112 may fund the purchase through various means, including, for example, cash, a check, and/or a payment account, etc. In this exemplary embodiment, the consumer 112 is associated with a payment account issued by the issuer 108. The payment account is, in turn, associated with a payment device 114, which may include, for example, a debit card, a credit card, a fob, a payment-enabled communication device (e.g., a smartphone, a wearable device, etc.), etc.

In one exemplary transaction, the consumer 112 may seek to purchase a product from the merchant 102 using his/her payment account, whereupon the consumer 112 presents the payment device 114 to the merchant 102. For example, the consumer 112 may swipe or insert (or otherwise present) the payment device 114 through/into a POS device (not shown) at the merchant 102 (e.g., a card reader, etc.). In response, the merchant 102 is configured to receive and/or retrieve credentials associated with the consumer's payment account from the payment device 114, for example, via the POS device, and to communicate an authorization request (broadly, a network request) for the purchase to the acquirer 104, via the network 110 (along path A in FIG. 1). In turn, the acquirer 104 is configured to communicate with the issuer 108, through the payment network 106 (again, via the network 110), for authorization of the transaction (e.g., to determine if the consumer's payment account is in good standing, if the transaction poses only an acceptable risk of fraud, and if there is/are sufficient credit/funds to complete the transaction, etc.). If the issuer 108 declines the transaction, the issuer 108 is configured to provide an authorization reply (broadly, a network reply) back to the merchant 102 declining the transaction, and the merchant 102 is able to terminate the transaction with the consumer 112, or request an alternate form of funding.

Conversely, if the issuer 108 accepts the transaction, the issuer 108 is configured to provide an authorization reply back to the merchant 102 (again, generally along path A) approving the transaction, and the merchant 102 is then able to proceed in the transaction. The transaction is then later (e.g., conventionally two to three days later, etc.) cleared and settled by and between the merchant 102 and the acquirer 104, and by and between the acquirer 104, the payment network 106 and the issuer 108 in accordance with one or more settlement arrangements, etc., as described in more detail below.

While only one merchant 102, one acquirer 104, one payment network 106, and one issuer 108 are illustrated in FIG. 1, it should be appreciated that any number or types of these entities (and their associated components) may be included in the system 100, or as a part of other system embodiments, consistent with the present disclosure. Likewise, only one consumer 112 and one payment device 114 are shown in FIG. 1 for purposes of illustration. However, other system embodiment will generally include additional consumers and payment devices.

FIG. 2 illustrates an exemplary computing device 200 that can be used in the system 100. The computing device 200 may include, for example, one or more servers, workstations, desktop computers, laptops, tablets, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the merchant 102, the acquirer 104, the payment network 106, and the issuer 108 are illustrated as including, or being implemented in, computing device 200, coupled to (and in communication with) the network 110. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, settlement indicators, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

Further, the illustrated computing device 200 also includes a network interface 206 coupled to (and in communication with) the processor 202 and the memory 204. The network interface 206 may include, without limitation, a wired network adapter, a wireless network adapter, a mobile network adapter, or other device capable of communicating to one or more different networks, including the network 110.

Referring again to FIG. 1, the system 100 includes a settlement engine 116, which is configured, by computer executable instructions, to perform one or more of the operations described herein. In the illustrated embodiment, the settlement engine 116 is provided as a part of the payment network 106, for example, as indicated by the dotted lines (e.g., located at the payment network 106, located in communication with the payment network 106, etc.). That said, the settlement engine 116 may be considered a computing device, which is consistent with the computing device 200. However, it should be appreciated that the settlement engine 116 may alternatively be separate, at least partly or entirely, from the payment network 106 in other embodiments (e.g., as a standalone part of the system 100, as part of one or more other components of the system 100, etc.).

In general, the settlement engine 116 is configured to register the acquirer 104 for settlement services, by the payment network 106, for certain transactions, such as, for example, irreversible transactions, etc. In so doing, the acquirer 104 may offload clearing and settlement of the certain transactions to the payment network 106, thereby alleviating the acquirer's work in later reporting the transactions to the payment network 106 and/or participating in the clearing and settlement processes (as conventionally described above), while at the same time advancing the transactions for more prompt settlement (in an unconventional manner). With that said, the acquirer 104 may identify the certain transactions for which it desires such unique settlement services to apply (e.g., during the registration process thereafter, etc.), for example, by transaction amounts, merchant category codes (MCCs), merchant identifiers (or ID's), payment account numbers (or ranges thereof), and/or other suitable criteria, etc. When the acquirer 104 provides or selects criteria associated with the certain transactions, the settlement engine 116 is configured to receive the criteria and compile rules associated with the criteria, which define when the payment network 106 will intercept the transactions and settle the transactions (and apply the particular settlement services on behalf of and/or in place of the acquirer 104).

For example, at least one rule associated with the implemented settlement services for the acquirer 104 may indicate the acquirer's preference for expedited settlement by the payment network 106 when a transaction involves a merchant associated with MCC 5814 (fast food restaurants), or when a transaction involves a merchant associated with merchant ID 123456. In addition, one or more rules may include a listing of multiple MCCs for which the acquirer 104 prefers settlement by the payment network 106. Additionally, or alternatively, one or more rules may, or may not, be associated with one or more threshold amounts (e.g., transactions involving total amounts of less than $10.00, etc.). With that said, Table 1 illustrates multiple exemplary rules that may be compiled by the settlement engine 116 for the acquirer 104.

TABLE 1

| Rule Number | Rule Criteria |
| --- | --- |
| Rule #1 | MCC = 5499 |
|  | (Miscellaneous Food Stores) |
| Rule #2 | Merchant ID = 123456 |
| Rule #3 | MCC = 4112 |
|  | (Passenger Railways) and <$10.00 |
| Rule #4 | MCC = 5814 |
|  | (Fast Food Restaurants) |
| Rule #5 | MCC = 7841 |
|  | (Video Entertainment Rental Stores) and MCC = 7338 |
|  | (Quick Copy, Reproduction and Blueprinting services) |
| ... | ... |

Once the desired rules are compiled, the settlement engine 116 is configured to store the rules in a data structure 118 (along with rules for other registered acquirers, etc.), which is coupled to (and is in communication with) the settlement engine 116. The data structure 118 may be a standalone part of the system 100, as shown in FIG. 1, or it may be included in the payment network 106 with the settlement engine 116, in memory of the settlement engine 116 (e.g., memory 204, etc.), or in memory elsewhere in the system 100, etc.

Subsequently in the system 100, the settlement engine 116 is configured to provide a settlement service to the acquirer 104 for the certain transactions specified by the acquirer 104, such as, for example, irreversible transactions, based on the compiled rules. In particular, in the context of the exemplary transaction above, the settlement engine 116 is configured to uniquely intercept the authorization reply, as conventionally provided from the issuer 108, for example: (i) when the transaction is directed to a registered acquirer, such as, for example, the acquirer 104; (ii) when the transaction includes an approval of the transaction; and/or (iii) when the transaction satisfies one or more of the rules associated with the acquirer 104 in the data structure 118 (e.g., one or more of the rules in Table 1, etc.). Thereafter (and after determining that one or more of the compiled rules are satisfied), the settlement engine 116 is configured to add the transaction to a pending settlement file at the payment network 106, for example, and then to append a flag indicator to the authorization reply for the transaction (identifying the transaction as approved for the registered settlement services). Specifically, for example, the flag indicator may be included at a data element (DE) of the authorization reply (e.g., at DE 48 of an ISO 8583 standard authorization request, at a new data element of the authorization request built during authorization of the transaction, etc.). The settlement engine 116 is then configured to release the authorization reply to the acquirer 104, with the flag indicator appended thereto.

In addition, for the intercepted and flagged certain transactions, the settlement engine 116 and/or the payment network 106 is/are configured to settle the transactions (e.g., on behalf of the registered acquirer 104, in place of or instead of the registered acquirer 104, etc.). Specifically, for example, upon intercepting an authorization reply from the issuer 108 for a transaction associated with the registered acquirer 104, the settlement engine 116 and/or the payment network 106 is configured to generate a clearing presentment message and to transmit the presentment message to the issuer 108 (on behalf of the acquirer 104, and instead of the acquirer 104 generating and transmitting such message later as is conventional). In connection therewith, the settlement engine 116 and/or the payment network 106 is/are configured to then generally immediately settle the transaction among the relevant accounts involved in the transaction (i.e., between the acquirer 104 and the issuer 108), by transferring the appropriate funds therebetween (e.g., the issuer 108 is configured to post the transaction to the consumer's account, and the settlement engine 116 and/or the payment network 106 is/are configured to cause appropriate funds to debit flow from the issuer 108 (on behalf of the consumer 112) and credit to the acquirer 104 (on behalf of the merchant 102); etc.).

Specifically, for example, the payment network 106 includes a clearing management system 120 (e.g., associated with computing device 200 of the payment network 106, etc.), which is configured to daily, or multiple times per day, generate a clearing ledger (broadly, a settlement summary) for transactions showing debits from consumers' payment accounts with issuers and credits to merchants' accounts with acquirers. As such, for the above example transaction involving the merchant 102 and the consumer 112, the payment network 106 is configured to modify conventional processing of the transaction through the clearing management system 120 based on the flag indicator appended to the authorization reply for the transaction by the settlement engine 116 and to include the transaction in the next available clearing ledger. Thereafter, a presentment message (e.g., as an added functionality to the clearing management system 120 of the payment network 106 whereby the payment network 106 operates on behalf of the acquirer 104, in an unconventional manner, to provide the unique settlement features described herein; etc.) showing the appropriate debit is transmitted to the issuer 108 (e.g., for posting to the consumer's account, etc.). Then, based on the clearing ledger, a settlement system 122 of the payment network 106 (e.g., associated with computing device 200 of the payment network 106, etc.) facilitates the transfer of funds between the respective accounts (e.g., between the account of the consumer 112 and the account of the merchant 102, etc.).

Finally, for the above example transaction involving the merchant 102 and the consumer 112, upon receipt of the authorization reply (now including the flag indicator) from the payment network 106, the acquirer 104 is configured to check for the flag indicator. If appended therein, the acquirer 104 is configured to ignore the transaction for purposes of clearing and settlement (since the payment network 106 is handling such operations on behalf of the acquirer 104), and to further provide the authorization reply along to the merchant 102 (as part of the conventional authorization process).

FIG. 3 illustrates an exemplary method 300 for providing transaction settlement as a service, on behalf of a registered acquirer, via a settlement payment network for transactions originated apart from the settlement payment network. The exemplary method 300 is described as implemented in the settlement engine 116, with further reference to the merchant 102, the acquirer 104, the payment network 106, and the issuer 108 of the system 100, and with still further reference to the computing device 200. However, the methods herein should not be understood to be limited to the system 100 or the computing device 200, as the methods may be implemented in other systems and/or computing devices. Moreover, the systems and the computing devices herein should not be understood to be limited to the exemplary method 300.

For purposes of illustration, the method 300 is described with reference to the exemplary transaction provided above in the system 100 between the consumer 112 and the merchant 102, where the acquirer 104 associated with the merchant 102 is registered for settlement services for transactions with the settlement engine 116. What's more, the registration of the acquirer 104 includes the entry of certain criteria from/by the acquirer 104, whereby (as part of such registration or subsequent thereto) the rules listed in Table 1 above were compiled by the settlement engine 116, stored in the data structure 118, and made available for application to transactions involving the acquirer 104 (including the above exemplary transaction).

Initially in the method 300, in response to the request by the consumer 112 to purchase the product from the merchant 102 (and presentation of the payment device 114 to the merchant 102), the merchant 102 compiles the authorization request for the transaction, at 302. The merchant 102, in this exemplary embodiment, includes a fast food restaurant, which offers hamburgers, cheeseburgers, French fries, etc. for sale to consumers, and which has a merchant ID 12223. The merchant 102, as such, is associated with the MCC 5814. In compiling the authorization request, the merchant 102 includes therein the amount of the purchase, for example, $12.45, the MCC 5814, the merchant ID 12223 for the merchant 102, and other suitable information (e.g., an acquirer ID for the acquirer 104 associated with the merchant 102, etc.). In general, in this exemplary embodiment, the authorization request is consistent with the ISO 8583 format, whereby specific transaction data will be included at specific data elements within the request, as defined by the ISO 8583 standard. The merchant 102 then transmits the authorization request to the acquirer 104, at 304. And, the acquirer 104 transmits the authorization request to the payment network 106, at 306, which in turn transmits the authorization request to the issuer 108 (associated with the consumer's payment account intended to fund the transaction), at 308.

Thereafter, the issuer 108, as is conventional, determines, at 310, whether to approve or decline the transaction. In this example, the transaction is approved, whereby, at 312, the issuer 108 compiles an authorization reply (e.g., an 0110 authorization response consistent with the ISO 8583 format, etc.) and then, at 314, transmits the authorization reply back to the payment network 106. It should be appreciated that the transaction data included in the authorization request, such as, for example, the transaction amount, the MCC, and the merchant ID, etc., is also included, by the issuer 108, in whole or in part, in the authorization reply.

At 316 in the method 300, the settlement engine 116 intercepts the authorization reply (broadly, the network reply) from the issuer 108, when the authorization reply is associated with a registered acquirer. Here, because the acquirer 104, to which the authorization is directed, is a registered acquirer, the settlement engine 116 intercepts the authorization reply (e.g., based on an acquirer ID or other identifier for the acquirer 104, as included in the authorization reply, being in a listing of registered acquirers; based on a matching of the merchant 102, as identified in the authorization reply, to the registered acquirer 104 (via a lookup table, etc.); etc.). Then, for the intercepted authorization reply, the settlement engine 116 retrieves, at 318, the rule(s) associated with the acquirer 104 from the data structure 118, for example, the rules as shown in Table 1. In general, as method 300 relates to settlement on behalf of the acquirer 104, the settlement engine 116 will often not intercept authorization replies, or at least will not consider any rules as described herein for authorization replies, in which the underlying transactions are declined by the issuer 108 (or other entity), because in such cases there are no transactions to be settled.

Next, the settlement engine 116 determines, at 320, if any of the retrieved rule(s) are satisfied by one or more parameters included in the intercepted authorization reply. In this example, as included in the authorization reply, the amount of the transaction is $12.45; the MCC is 5814; and the merchant ID of the merchant 102 is 12223. As such, based on the rules in Table 1 for the acquirer 104, the settlement engine 116 determines that the authorization reply does not satisfy Rule #1 because the MCC of the authorization reply (i.e., 5814) does not match the MCC 5499 of Rule #1. Further, the settlement engine 116 determines that the authorization reply does not satisfy Rule #2 because the merchant ID of the merchant 102 associated with the authorization reply (i.e., 12223) does not match the merchant ID 123456 of Rule #2. Further still, the settlement engine 116 determines that the authorization reply does not satisfy Rule #3 because the MCC of the authorization reply (i.e., 5418) does not match the MCC 4112 nor is the transaction amount from the authorization reply less than $10.00 (i.e., threshold amount for Rule #3) as specified in Rule #3. And, the settlement engine 116 determines that the authorization reply does not satisfy Rule #5 because the MCC of the authorization reply (i.e., 5418) does not match either the MCC 7814 or the MCC 7338 of Rule #5. However, the settlement engine 116 determines that the authorization reply does satisfy Rule #4 because the MCC of the authorization reply (i.e., 5814) matches the MCC 5814.

Consequently, at 322, the settlement engine 116 appends an indicator, and specifically, a flag indicator (or settlement indicator), to the authorization reply (e.g., based on Rule #4 being satisfied, etc.). The indicator may include, for example, a set bit (e.g., 0 not set, 1 set; etc.), a specific character(s) (e.g., alpha character(s), numeric character(s), etc.), or other indicator identifying the transaction as being subject to the registered settlement services described herein. In this exemplary embodiment, and as generally described above in the system 100, the flag indicator is included at one or more desired data elements of the ISO 8583 formatted authorization reply. In addition, when the rule(s) associated with the registered acquirer 104 is satisfied, the settlement engine 116 appends the transaction (based on the authorization reply) to a settlement process, by the payment network 106 (for the clearing management system 120 of the payment network 106), at 324, thereby implementing the registered settlement service.

Subsequently in the method 300, the payment network 106 transmits, at 326, the authorization reply, with the appended flag indicator, to the acquirer 104. As such, the acquirer 104 is notified of the registered settlement of the transaction by the payment network 106 on behalf of the acquirer 104.

With continued reference to FIG. 3, at 328, the acquirer 104 identifies the flag indicator in the authorization reply, and then, at 330, omits the transaction from the acquirer's clearing/settlement reporting to the payment network 106 (and, particularly, such reporting to the clearing management system 120 of the payment network 106). Specifically, for a conventional transaction not subject to the registered settlement services herein, upon receiving the authorization reply approving the transaction, the acquirer 104 would subsequently include the transaction in clearing/settlement reporting to the payment network 106 (e.g., in a customer initiated presentment initiation for the transaction, etc.). Herein, however, because the registered settlement service is available to the acquirer 104 and the settlement engine 116 already included the transaction in the settlement process (at 324) (e.g., as a payment network-on-behalf presentment initiation for the transaction, etc.), the acquirer 104 does not have to further report or otherwise inform the payment network 106 of the transaction. Thus, in the method 300, in connection with identifying the flag indicator, or later, the acquirer 104 transmits the authorization reply to the merchant 102, at 332. In response, because the authorization reply, in this example, includes an approval of the transaction, the merchant 102 is permitted to complete the transaction with the consumer 112, at 334, thereby permitting the consumer 112 to leave the merchant 102 with the product(s) purchased.

In the meantime in the method 300 (e.g., at about the same time or shortly thereafter, etc.), the payment network 106 directs clearing and settlement of the transaction (on behalf of the acquirer 104) along with one or more other transactions (that are also subject to the settlement services or that are subject to conventional settlement), at 336. Specifically, the payment network 106 (or the settlement engine 116) compiles a clearing presentment message (e.g., immediately or almost immediately after successful authorization), which is provided to the issuer 108 as described above and which is the subject of a fund transfer. As such, and in accordance with the message, funds are transferred from the issuer 108 to the acquirer 104, whereby the funds are to be debited from the consumer's account at the issuer 108 (i.e., the payment account for funding of the transaction) and credited to the merchant's account at the acquirer 104.

In connection therewith, the payment network 106 (e.g., the clearing management system 120 thereof, etc.) compiles a settlement summary (or clearing ledger), at 338, for the transaction and any other transactions settled therewith. The payment network 106 then transmits the settlement summary, in whole or in part, to the issuer 108, at 340, and to the acquirer 104, at 342. In one example, the settlement summary is transmitted to the issuer 108, for example, in the form of a presentment message listing one or more fund transfers associated with the transaction and additional transactions to/from the issuer 108, for example. In turn, the issuer 108 confirms the settlement of the transaction, at 344 (e.g., marks off the transaction, as settled, in internal records, etc.), and the acquirer 104 confirms the settlement of the transaction, at 346. And, based on the clearing ledger, the payment network 106 (e.g., the settlement system 122 thereof, etc.) facilitates the transfer of funds between the account of the consumer 112 and the account of the merchant 102.

In view of the above, the systems and methods herein permit generally expedited settlement of certain types of transactions (e.g., transactions consistent with specific rules, etc.) on behalf of acquirers associated therewith, whereby the acquirers may be omitted from further handling, processing and/or reporting (to payment networks) of the transactions in order to settle and clear them (e.g., without other substantive change to the clearing and settlement processes, etc.). As such, when the systems and methods herein are implemented for the certain transactions, such as small amount transactions and/or irreversible transactions (e.g., transactions to fast food merchants, for transit, or to vending merchants, etc.), for example, the transaction burdens and associated costs to the involved acquirers may be reduced, while at the same time more promptly injecting the transactions for clearing and settlement (e.g., immediately or almost immediately after successful authorization, etc.). As can be appreciated, this may allow for, and actually provide, an increased efficiency in or of the payment network or system and, thereby, a more prompt payment of the transactions. What's more, the settlement services associated with the systems and methods herein may be implemented in connection with conventional clearing management systems and settlement systems of the involved payment networks, whereby the services may be readily and efficiently provided to the acquirers in connection with the market transactions.

Again, and as previously described, it should be appreciated that the functions described herein, in some embodiments, may be described in computer executable instructions stored on a computer-readable media, and executable by one or more processors. The computer readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program codes in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated, based on the foregoing specification, the above-described embodiments of the disclosure may be implemented using computer programming or engineering techniques, including computer software, firmware, hardware or any combination or subset thereof, wherein the technical effect may be achieved by performing at least one of the following operations: (a) transmitting a network request (e.g., an authorization request), received from a first entity (e.g., an acquirer), to a second entity (e.g., an issuer); (b) intercepting, by at least one computing device, a network reply (e.g., an authorization reply) from the second entity, when the network reply is associated with the first entity and the first entity is a registered entity, the network reply including at least one parameter; (c) appending, by the at least one computing device, an indicator (e.g., a flag indicator) to the network reply when a rule associated with the first entity is satisfied by the at least one parameter of the network reply; (d) appending, by the at least one computing device, a transaction associated with the network reply to a clearing and/or settlement process when the rule is satisfied by the at least one parameter of the network reply; and (e) transmitting the network reply, with the appended indicator, to the first entity, whereby, upon identifying the indicator, the first entity is permitted to omit the transaction from further handling and/or reporting, to a network associated with the at least one computing device, related to clearing and/or settlement of the transaction.

As will also be appreciated, based on the foregoing specification, the above technical improvement in the payment system as described above is a computer-based solution to a technical deficiency or problem that is itself rooted in computer technology (i.e., the problem itself derives from the use of computer technology). More specifically, the issues and inefficiencies created by the conventional authorization, clearing, and/or settlement systems are the result of implementation and use of computer systems to effect authorization, clearing, and/or settlement of payment card transactions. The systems and methods may herein improve upon the conventional computer-related authorization, clearing, and/or settlement systems by identifying certain transactions based on certain criteria or tags affiliated or affixed to those transactions (or the messages related thereto), removing those transactions from the typical clearing and settlement flow or cycle, and then directing those transactions into a different (or more timely) clearing and settlement flow or cycle. Thus, the inefficiencies or problems of the conventional authorization, clearing, and/or settlement systems as described herein are solved (i.e., the desired outcome of achieving increased efficiencies over the conventional authorization, clearing, and/or settlement systems are achieved) by the methods described and particularly claimed herein.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for use in distributing processing of transactions to a payment network, the method comprising:
    transmitting, by a payment network computing device associated with a payment network, a network request, received from an acquirer, to an issuer
    intercepting, by the payment network computing device, a network reply from the issuer, in response to the network reply being associated with the acquirer and the acquirer being registered with the payment network for irrevocable transaction settlement services;
    appending, by the payment network computing device, an indicator of network settlement to the network reply, in response to a rule associated with the acquirer being satisfied by one of a merchant category code (MCC) and a merchant identifier included in the network reply;
    appending, by the payment network computing device, a transaction associated with the network reply to a clearing and/or settlement process of the payment network, in response to said rule associated with the acquirer being satisfied; and
    transmitting the network reply, with the indicator, to the acquirer, whereby, upon identifying the indicator, the acquirer is permitted to omit the transaction from further reporting to the payment network in connection with clearing and/or settlement of the transaction.

2. The method of claim 1, wherein the issuer is an issuer of a payment account associated with a consumer for funding of the transaction; and
    wherein the acquirer is an issuer of a payment account associated with a merchant initiating the transaction for receiving funds on behalf of the merchant for the transaction.

3. The method of claim 1, further comprising determining, by the payment network computing device, whether the rule associated with the acquirer is satisfied by the one of the MCC and the merchant identifier included in the network reply.

4. The method of claim 1, wherein the rule associated with the acquirer includes a threshold amount, and wherein the rule is further satisfied when a transaction amount for the transaction associated with the network reply is less than the threshold amount.

5. The method of claim 1, wherein the rule associated with the acquirer includes a listing of multiple MCCs, and wherein the rule is satisfied when the MCC included in the network reply is included in the listing of multiple MCCs associated with the rule.

6. The method of claim 1, wherein the network reply includes an authorization reply; and
    wherein appending the indicator to the network reply includes appending a flag indicator to the authorization reply.

7. The method of claim 1, further comprising performing the clearing and/or settlement process for the transaction without receiving reporting, prior to the clearing and/or settlement process for the transaction, directed thereto from the acquirer.

8. A system for use in distributing processing of transactions to a payment network, the system comprising:
    a payment network including a computing device configured to:
        intercept a network reply from an issuer when the network reply is directed to a registered acquirer, the network reply associated with a transaction and including at least one parameter of the transaction;
        retrieve, from a data structure associated with the computing device, at least one rule associated with the registered acquirer; and
        when the at least one parameter of the network reply satisfies the at least one rule:
            append a flag indicator indicative of network settlement of the transaction to the network reply and transmit the network reply with the flag indicator to the registered acquirer, whereby upon identifying the flag indicator in the network reply, the registered acquirer is permitted to omit the transaction from further reporting of the transaction to the payment network for clearing and settlement of the transaction; and
            append the transaction to a settlement process associated with the payment network, independent of any reporting of the transaction from the registered acquirer.

9. The system of claim 8, wherein the computing device is further configured to determine if the at least one rule is satisfied by the at least one parameter of the network reply.

10. The system of claim 9, wherein the at least one rule includes at least one merchant category code (MCC);
    wherein the at least one parameter of the network reply includes an MCC for a merchant involved in the transaction; and
    wherein the computing device is configured to:
        determine if the MCC of the network reply matches the at least one MCC of the at least one rule; and append the flag indicator to the network reply when the MCC of the network reply matches the at least one MCC of the at least one rule.

11. The system of claim 9, wherein the at least one rule includes at least one merchant ID;
   wherein the at least one parameter of the network reply includes a merchant ID for a merchant involved in the transaction; and
   wherein the computing device is configured to:
      determine if the merchant ID of the network reply matches the at least one merchant ID of the at least one rule; and
      append the flag indicator to the network reply when the merchant ID of the network reply matches the at least one merchant ID of the at least one rule.

12. The system of claim 9, wherein the computing device is further configured to transmit a network request for the transaction to the issuer, prior to intercepting the network reply in response to the network request.

13. The system of claim 8, wherein the computing device is further configured to receive a network request for the transaction from the registered acquirer and transmit the network request to the issuer, prior to intercepting the network reply, and to transmit the network reply, with the appended flag indicator, to the registered acquirer.

14. The system of claim 13, wherein the computing device is further configured to clear and/or settle the transaction when the transaction is appended to the settlement process associated with the payment network.

15. The system of claim 14, wherein the computing device is further configured to append the transaction to the settlement process associated with the payment network after transmitting the network reply for the transaction, with the appended flag indicator, to the registered acquirer.

16. The system of claim 13, wherein the computing device is further configured to transmit a settlement report to at least one of the issuer and the registered acquirer in connection with the payment network clearing and settling the transaction.

17. The system of claim 8, wherein the computing device is configured, in connection with appending the flag indicator to the network reply, to append the flag indicator to a data element of the network reply.

18. A non-transitory computer-readable storage medium comprising executable instructions, which when executed by at least one processor of a payment network, cause the at least one processor to:
   intercept a network reply from a first entity, when the network reply is directed to a registered second entity, the network reply associated with a transaction and including at least one parameter of the transaction;
   retrieve, from a data structure, at least one rule associated with the registered second entity; and
   when the at least one parameter of the network reply satisfies the at least one rule associated with the registered second entity:
      append a flag indicator indicative of network settlement of the transaction to the network reply; and
      transmit the network reply with the appended flag indicator to the registered second entity, whereby upon identifying the flag indicator in the network reply, the registered second entity is permitted to omit the transaction from further reporting of the transaction to the payment network for clearing and settlement of the transaction.

19. The non-transitory computer-readable storage medium of claim 18, wherein the executable instructions, when executed by the at least one processor, further cause the at least one processor to register the second entity to the data structure, and generate and store the at least one rule in the data structure in association with the registered second entity.

20. The non-transitory computer-readable storage medium of claim 18, wherein the at least one rule is based on at least one of a transaction amount, a merchant category code (MCC), and a merchant ID.

* * * * *